United States Patent

Scheffler et al.

[11] 4,161,966
[45] Jul. 24, 1979

[54] SPACER FOR COAXIAL TUBE SYSTEMS

[75] Inventors: Ernst Scheffler; Friedrich Schatz; Gerhard Ziemek, all of Langenhagen, Fed. Rep. of Germany

[73] Assignee: Kabel-und Metallwerke Gutehoffnungshutte Aktiengesellschaft, Hanover, Fed. Rep. of Germany

[21] Appl. No.: 847,083

[22] Filed: Oct. 31, 1977

Related U.S. Application Data

[63] Continuation of Ser. No. 734,663, Oct. 12, 1976, abandoned.

[30] Foreign Application Priority Data

Oct. 23, 1975 [DE] Fed. Rep. of Germany ....... 2547423

[51] Int. Cl.² .............................................. F16L 9/18
[52] U.S. Cl. ................................... 138/112; 138/114; 138/148
[58] Field of Search ............... 138/112, 114, 148, 149; 428/178, 222, 166, 198, 294

[56] References Cited

U.S. PATENT DOCUMENTS

| 3,592,238 | 7/1971 | Scheffler et al. | 138/148 |
| 3,670,772 | 6/1972 | Ziemek et al. | 138/114 |
| 3,756,902 | 9/1973 | Konecny et al. | 138/148 |

FOREIGN PATENT DOCUMENTS

| 531014 | of 1954 | Belgium | 428/166 |
| 1170026 | 1/1959 | France | 428/178 |

Primary Examiner—Lenard A. Footland
Attorney, Agent, or Firm—Smyth, Pavitt, Siegemund, Jones & Martella

[57] ABSTRACT

Spacer for concentrically disposed tube systems where a temperature drop exists between adjacent tubes. This may consist, for example, of a superconducting electric cable or alternatively of a tube system for carrying heated liquid or gaseous media. The concentric tubes are spaced by a winder which touches the surfaces of adjacent tubes at particular points and which consists of ribbons of insulating material disposed adjacent to each other. The individual ribbons are so formed and so arranged that they touch adjacent tube surfaces either at only individual points or at lines.

3 Claims, 6 Drawing Figures

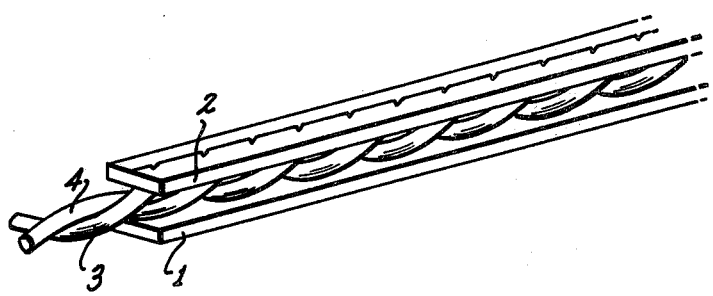
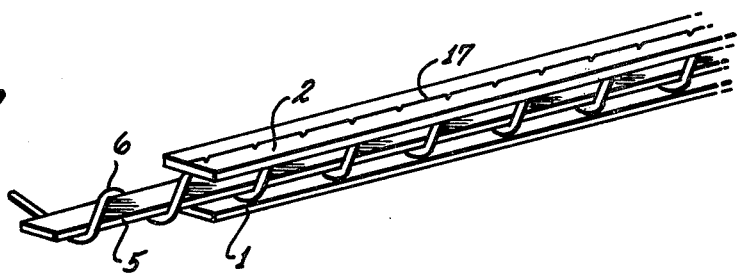
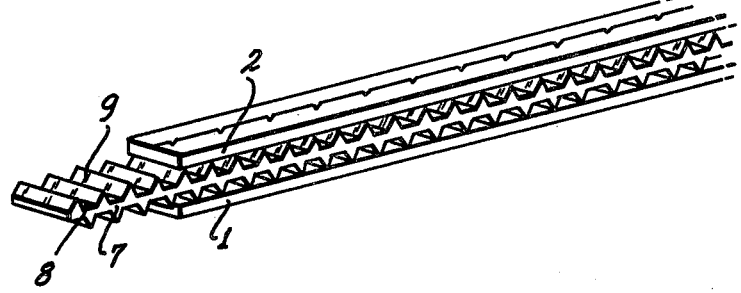
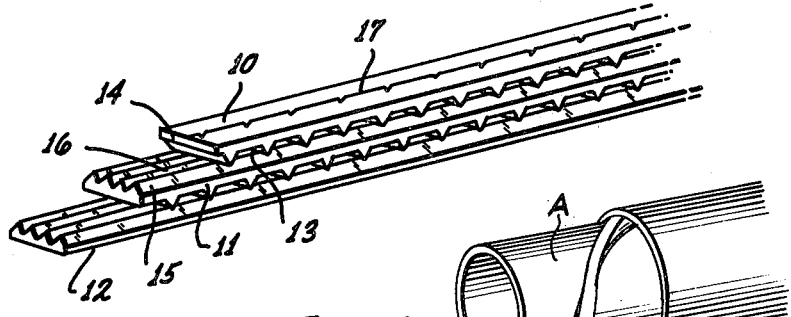
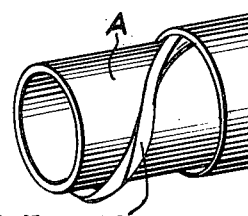
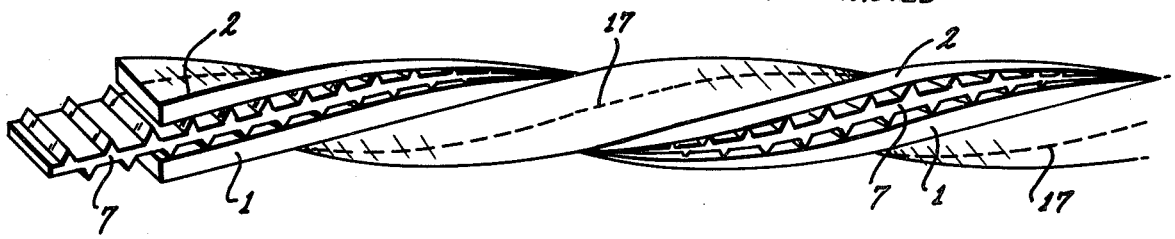

SPACER FOR COAXIAL TUBE SYSTEMS

This is a continuation of application Ser. No. 734,663 filed Oct. 12, 1976 now abandoned.

BACKGROUND OF THE INVENTION

This invention relates to spacers for coaxially arranged tube systems where a temperature difference exists between individual tubes. Specifically the tubes are spaced from each other by helical spacers which include ribbons or strips of insulating material and having low thermal conductivity, these strips being so arranged that they touch the respective tubes only at individual areas.

It is already known, for example, to utilize cable cooled to very low temperatures for transmitting electric energy. In this case the conductor consists of a tube the interior of which is cooled by liquid helium. In order to protect the tube from externally supplied heat, additional tubes are provided which concentrically surround the central tube and which are spaced from each other. A vacuum may be maintained in a space between the innermost and the adjacent tube. The separation between the second and third tube is conventionally filled with liquid nitrogen in order to control the temperature drop towards the interior. The space between the third and the last tube may again be evacuated and this last or outermost tube has ambient temperature. Similarly arranged tube systems which may not be cooled with liquid nitrogen may also be utilized for transporting liquified gases or other media at very low temperatures. Essential for all these constructions is the fact that the heat loss either by conduction of heat or by radiation is reduced to a minimum without which economical operation of such systems would not be possible.

To this end innumerable proposals have been made for spacers providing a minimum of heat loss. For example, the spacer may be arranged in the form of helical coils surrounding the innermost tube or disc shaped supporting elements to support the tubes in concentric relationship.

U.S. letters Pat. No. 3,592,238 and No. 3,670,772 disclose spacer constructions for coaxial tube systems in which the helical spacer is constructed from individual ribbons which are loosely superimposed upon each other. The ribbons or strips may additionally be twisted in the form in which they are used in order to further reduce the heat transfer from one tube to another.

SUMMARY OF THE INVENTION

It is accordingly an object of the present invention to provide a helical spacer construction of this type which further minimizes the heat transfer between two adjacent tubes by the special arrangement or construction of the ribbons jointly forming a helix.

A further object of the present invention is to further reduce the heat loss which occurs when the known winder is used in order to provide an economical energy transfer.

These objects are accomplished in accordance with the preferred embodiment of the present invention for spacers for coaxial tube systems as previously discussed by the particular construction or arrangement of individual flat, elongated elements such as ribbons or strips to provide that the ribbons touch adjacent tube surfaces either at individual points or along certain lines only. This makes possible the use of a helical construction for the spacer of such tube systems without causing an uneconomical heat invasion. Heat bridges between the respective inner and outer tubes occur only at individual points or lines. Independently, therefrom, the helix guarantees the necessary distance between the tubes along the entire length of the tube system in such a manner that the two tubes cannot touch each other as that could cause a failure of the cable or tube system.

If the superimposed flat elements of the helix consist of individual flat elements, it has been found to be particularly advantageous that the facing surfaces of these ribbons should have a differential profile, that is when they are differently contoured. These profiles may consist, for example, in that the facing surfaces of the elongated elements are provided with longitudinal or transverse notches or slots to generate roof-like surfaces. In this manner the contact between individual elements is further reduced so that areas of intensive heat transfer are avoided. Similarly, it may be advantageous to periodically change the profiles of the ribbons, strips, etc., or the special construction of individual string elements which are altered with respect to the points or lines of contact with the tube surfaces.

It is furthermore advantageous when the helix for spacing two tubes consists of a plurality of superimposed ribbons. In this case the central ribbon between two outer ribbons should have a profile at both sides to provide a further reduction of the heat transferring surfaces. A further possibility for the same purpose is to provide a spacing element between two ribbons or other strings and to wind another strand around the spacing element.

It may be advantageous in certain cases to secure the individual elements forming a spacer which may consist of ribbons or other profiled or unprofiled strings by mechanical means such as sewing, nailing or pasting; this may be done within predetermined distances. This in turn yields certain advantages for the manufacture of such tube systems suitable for very low temperatures.

The helical spacer itself may consist of three profiled or contoured ribbons, strips, strands, etc. However, four or more ribbons, strips, etc., may also be used to provide a self-supporting winder which may be wrapped between concentric tubes in order to provide a mechanically solid spacer which is a low conductor of heat. The individual ribbons of the spacer may consist of any material suitable for low temperatures. Synthetic materials such as those based on polytetrafluorethylene may be used. In some cases further advantages may be obtained when the individual adjacent ribbons consist of different material. In this case layers of different heat transfer quality and mechanical stability may alternate. A selection of the material according to the particular construction of the spacers may be suitable where at different places of the spiral spacer, different mechanical forces such as compression and tension forces are active.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings, in which:

FIGS. 1 through 4 are views in perspective of different embodiments of the spacer of the invention;

FIG. 5 illustrates a further embodiment of the spacer of the invention where adjacent ribbons are stranded; and FIG. 6 illustrates a view into a coaxial tube system.

Referring now to FIG. 1 there is illustrated a spacer prior to being wound spirally on a tube A in spaced-apart loops as shown in FIG. 6 for supporting thereon another tube B in concentric relation thereto. For purposes of this disclosure the tube system can be of the same type as shown in U.S. patents No. 3,592,238 and No. 3,670,772. The specific spacer shown in consists of two strips or ribbons 1 and 2 between which is disposed a string or strand being comprised of two individual elements 3 and 4 which in turn space the two ribbons 1 and 2. The spacer assembly is sewn together as indicated by the thread 20.

This construction provides a point or line-like contact between adjacent surfaces of the ribbons or strips in order to reduce the heat transfer loss. The assembly is then helically wound onto a tube.

A similar construction is illustrated in FIG. 2 where between the spaced ribbons or strips 1 and 2 there is disposed a third ribbon 5 surrounded by a helical string 6 which provides the mechanical contact between ribbons 1 and 2. FIG. 3 illustrates a ribbon 7 being disposed between the ribbons 1 and 2. Ribbon 7 is contoured or profiled on both surfaces. The profile consists basically of slots or notches 8 extending in a transverse direction so that roof-like surfaces 9 are formed. The upper edges of the surfaces 9 contact the adjacent ribbons 1 and 2.

A different embodiment is illustrated in FIG. 4. Here profiled ribbons 10, 11 and 12 are being used. A central ribbon 11 is provided with a profile on both sides which extend on one side in the longitudinal direction and on the other in a transverse direction. On the other hand, the ribbon 10 is provided at the surface facing the ribbon 11 with slots or notches 13 extending in a transverse direction so that the edges 14, together with the roof-like surfaces 15, or its edges 16, and which extend in a longitudinal direction provide point-like contacts. The same point-like contact is also present between the ribbon 11 and the lowermost ribbon 12, one of which, that is the ribbon 11, is provided with transverse slots or notches and the ribbon 12 with longitudinal notches. The connection of the ribbons by sewing, nailing or the like is schematically indicated at 17.

FIG. 5 finally illustrates an embodiment where the (presently still straight) spacer has elements basically arranged in accordance with FIG. 3, having ribbons 1 and 2 and an intermediate profiled ribbon 7. However, the entire assembly has been twisted. As shown, linear contacts are provided only between the elements. Accordingly, when this winder is utilized for spacing concentric tubes, only line-like contacts are made with the adjacent tube surfaces or even point-like contacts, particularly when the adjacent tube surfaces consist of corrugated metal tubes. Particularly in the latter case, the spacer winders previously described in the drawings provide a minimum of heat transfer between individual tubes. Therefore the entire system can be operated economically.

The invention is not limited to the embodiments described above but all changes and modifications thereof not constituting departures from the spirit and scope of the invention are intended to be included.

We claim:

1. A coaxial tube system, including a helical spacer for spacing an inner tube of the system from another tube thereof in coaxial relation, there being a temperature gradient between the tubes such as, for example, in an electric cable operated in a superconducting state or in the inner tube of such a system for carrying fluid media, said helical spacer comprising:

a plurality of flat elongated, relatively narrow, superimposed elements of an insulating material, the elements being so disposed and at least some of them having a profiled surface established by notches separated by roof-like extremeties, the notches of surfaces of respective two of the elements facing each other extending transversely to each other so that individual, adjacent elements will contact each other at spaced points on the respective roof-like extremeties only, said elements being wound onto the inner tube in spaced-apart loops and being twisted, thereby holding the outer tube on the inner tube.

2. Spacer as defined in claim 1 wherein means are provided for securing together individual elements at spaced areas.

3. A coaxial tube system, including a helical spacer for spacing an inner tube of the system from another tube thereof in coaxial relation, there being a temperature gradient between the tubes such as, for example, in an electric cable operated in a superconducting state or in the inner tube of such a system for carrying fluid media, said helical spacer comprising:

a plurality of flat elongated, relatively narrow, superimposed elements of an insulating material, the elements being arranged such that three form an assembly of spacer elements of which an intermediate one differs as to its overall surface contour on both of its sides from facing surface contours of the two other elements, whose surfaces facing away from the intermediate one are respectively substantially flat, while the surface contours, as facing the intermediate one will make contact with extremeties in the surface contour of the intermediate one in spaced points or short lines only, said points or lines of contact recurring regularly along the length the extension of the elements, said elements being wound onto the inner tube in spaced-apart loops and being twisted, thereby holding the outer tube on the inner tube; and wherein the respective facing and contacting surfaces are both provided with notches extending traversely to each other.

* * * * *